(12) United States Patent
Schlüter et al.

(10) Patent No.: US 7,805,522 B2
(45) Date of Patent: Sep. 28, 2010

(54) METHOD FOR THE TRANSMISSION OF USER DATA OBJECTS

(75) Inventors: Marc Schlüter, Braunschweig (DE); Andreas Schmidt, Braunschweig (DE); Norbert Schwagmann, Braunschweig (DE); Markus Trauberg, Velchede (DE)

(73) Assignee: Siemens Aktiengesellschaft, Munich (DE)

( * ) Notice: Subject to any disclaimer, the term of this patent is extended or adjusted under 35 U.S.C. 154(b) by 978 days.

(21) Appl. No.: 10/525,607

(22) PCT Filed: Jul. 25, 2003

(86) PCT No.: PCT/DE03/02525

§ 371 (c)(1),
(2), (4) Date: Feb. 25, 2005

(87) PCT Pub. No.: WO2004/021676

PCT Pub. Date: Mar. 11, 2004

(65) Prior Publication Data

US 2005/0283533 A1    Dec. 22, 2005

(30) Foreign Application Priority Data

Aug. 26, 2002  (DE)  ................... 102 39 061

(51) Int. Cl.
*G06F 15/16* (2006.01)
(52) U.S. Cl. .................. 709/228; 709/232
(58) Field of Classification Search ............. 709/246, 709/227, 231, 315, 224, 249, 228, 232; 455/557, 455/403; 370/338, 329; 379/229; 707/10
See application file for complete search history.

(56) References Cited

U.S. PATENT DOCUMENTS 6,374,246 B1 *  4/2002  Matsuo ................. 707/10
6,781,972 B1 *  8/2004  Anderlind et al. ........... 370/329

(Continued)

FOREIGN PATENT DOCUMENTS

JP    11250009    9/1999

(Continued)

OTHER PUBLICATIONS

3GPP TS 140 version 5.1.0 Release 5; Third Generation Partnership Project: Technical Specification Group Terminals; Multimedia Messaging Service (MMS) Functional Description; Stage 2.

(Continued)

*Primary Examiner*—Jungwon Chang
(74) *Attorney, Agent, or Firm*—King & Spalding L.L.P.

(57) ABSTRACT

Disclosed is a method for transmitting user data objects from a data-supplying component or a data server to a telecommunication device of a user via a connection component. The data-supplying component is informed via profile information in a profile object what types of user data objects the connection component or the telecommunication unit is able to process on its own such that the data supplying component can specifically transmit user data objects to the telecommunication device, which belong to the type that the telecommunication device can process. Hence, the data-supplying component is prevented from sending user data objects of a type that has to be converted by the connection component on the transmission path in order to be able to processed by the telecommunication device.

17 Claims, 3 Drawing Sheets

| Code | -1 | 0 | 1 | 2 | 3 | 4 |
|---|---|---|---|---|---|---|
| Devices/ transmission unit | | WAP-capable terminal | | WAP gateway | WAP proxy | ... |
| Category | | Basic profile | | Difference profile | | |
| Supplementing additional profiles allowed | no | yes | yes | yes | | ... |

U.S. PATENT DOCUMENTS

| | | | |
|---|---|---|---|
| 6,978,316 B2* | 12/2005 | Ghaffar et al. | 709/246 |
| 7,289,480 B2* | 10/2007 | Lundstrom et al. | 370/338 |
| 7,330,542 B2* | 2/2008 | Kauhanen et al. | 379/229 |
| 2001/0010685 A1* | 8/2001 | Aho | 370/329 |
| 2002/0032771 A1* | 3/2002 | Gledje | 709/224 |
| 2002/0078253 A1 | 6/2002 | Szondy et al. | |
| 2003/0065802 A1* | 4/2003 | Vitikainen et al. | 709/231 |
| 2003/0212827 A1* | 11/2003 | Saha et al. | 709/247 |
| 2004/0019683 A1* | 1/2004 | Lee et al. | 709/227 |
| 2004/0204073 A1* | 10/2004 | Yanosy | 455/557 |
| 2006/0052080 A1* | 3/2006 | Vitikainen et al. | 455/403 |

FOREIGN PATENT DOCUMENTS

| | | |
|---|---|---|
| JP | 2001084183 | 3/2001 |
| JP | 2001251341 | 9/2001 |

OTHER PUBLICATIONS

WAP-274-MMS Architecture Overview; WAP Multimedia Messaging Service (MMS) Specification—Wireless Application Protocol.

WAP-275 MMS Client Transactions; WAP Multimedia Messaging Service (MMS) Specification Suite 2.0 Wireless Application Protocol.

WAP-276 MMS Encapsulation; WAP Multimedia Messaging Service (MMS) Specification Suite 2.0 Wireless Appplication Protocol.

WAP Forum: "WAG UAProf Version Oct. 20, 2001" Wireless Application Protocol, pp. 1-86.

3GPP TS 23.040 version 5.2.0 Release 5, Third Generation Partnership Project, Technical Specification Group Terminals, Technical realization of the Short Message Service (SMS).

3GPP TS 22.140 version 4.1.0 Release 4, Third Generation Partnership Project; Technical Specification Group Services and System Aspects; Service Aspects; Stage 1, Multimedia Messaging Service (MMS).

RFC 2616 "Hypertext Transfer Protocol—HTTP/1.1" Jun. 1999.

WAP-230-WSP Wireless Session Protocol Specification, approved version Jul. 5, 2001.

RFC 822 "Standard for the format of ARPA internet text messages", David H. Crocker, Aug. 13, 1982.

WAP Forum: "WAG UAProf Version Oct. 20, 2001" Wireless Application Protocol, pp. 1-86.

* cited by examiner

FIG 2

| Code | -1 | 0 | 1 | 2 | 3 | 4 |
|---|---|---|---|---|---|---|
| Devices/ transmission unit | WAP-capable terminal | | | WAP gateway | WAP proxy | ... |
| Category | Basic profile | | Difference profile | | | |
| Supplementing additional profiles allowed | no | yes | yes | yes | | ... |

FIG 3

```
<?xml version="1.0"?>
<rdf:RDF xmlns="http://www.w3.org/1999/02/22-rdf-syntax-ns#"
xmlns:rdf="http://www.w3.org/1999/02/22-rdf-syntax-ns#"
xmlns:prf="http://www.wapforum.org/profiles/UAPROF/ccppschema-20010330#"
xmlns:prf2="http://www.wapforum.org/profiles/UAPROF/ccppschema-20020301#">

<rdf:Description rdf:ID="Example_Profile">
...
<prf:component>
    <rdf:Description rdf:ID="Example_Component_1">
    <rdf:type rdf:resource="http://www.wapforum.org/profiles/Example_Component_1"/>
    <prf2:Source> WAP Gateway </prf2:Source>
    <prf:CcppAccept>
    <rdf:Bag>
    <rdf:li>image/JPEG</rdf:li>
    </rdf:Bag>
    </prf:CcppAccept>
</rdf:Description>
</prf:component>
...
</rdf:Description>
</rdf:RDF>
```

FIG 4

```
<?xml version="1.0"?>
<rdf:RDF xmlns="http://www.w3.org/1999/02/22-rdf-syntax-ns#"
xmlns:rdf="http://www.w3.org/1999/02/22-rdf-syntax-ns#"
xmlns:prf="http://www.wapforum.org/profiles/UAPROF/ccppschema-20010330#"
xmlns:prf2="http://www.wapforum.org/profiles/UAPROF/ccppschema-20020301#"

<rdf:Description rdf:ID="Example_Profile">
...
<prf:component>
    <rdf:Description rdf:ID="Example_Component_1">
    <rdf:type rdf:resource="http://www.wapforum.org/profiles/Example_Component_1"/>
```
```
    <prf2:Source>
    <rdf:Seq>
        <rdf:li>3</rdf:li>
        <rdf:li>WAP Gateway</rdf:li>
    </rdf:Seq>
    </prf2:Source>
```
```
    <prf:CcppAccept>
    <rdf:Bag>
        <rdf:li>image/JPEG</rdf:li>
    </rdf:Bag>
    </prf:CcppAccept>
</rdf:Description>
</prf:component>
...
</rdf:Description>

</rdf:RDF>
```

METHOD FOR THE TRANSMISSION OF USER DATA OBJECTS

BACKGROUND OF THE INVENTION

The present invention relates to a method for the transmission of user data objects from a data supply component or a data server to a telecommunication device of a user via a connection component, with profile information in a profile object of the data supply component indicating which type of user data objects the connection component or the telecommunication device is able to process on its own.

A method for the transmission or downloading of user data objects from a data supply component onto a telecommunication device, particularly designed as a mobile radio device, is currently being discussed. The starting point for such discussions is that the telecommunication device is located in a telecommunication network designed as a mobile radio network, in which data generally, and user data objects in particularly, are transmitted via a protocol specified by the WAP Forum (WAP: Wireless Application Protocol). It is further assumed that the data supply component of a data or content supplier is located in a further telecommunication network which is particularly embodied as an Internet Protocol-based network. To establish a data connection between the data supply component and the telecommunication device at least two different sub-interfaces are needed; namely an air interface on the one hand and a cable-based interface on the other. There is provision for WAP protocols to be used, as already mentioned, for bridging the air interface. By contrast, in the telecommunication network of the data supply component, HTTP (HTTP: Hypertext Transfer Protocol) is used. Thus, since different protocols are used on the air interface and the network side, there is provision for a connection component to be used (in this instance, what is known as a WAP gateway) which adapts the user data to the various lower layers (air interface, e.g., WSP (Wireless Session Protocol) as a WAP; network side: HTTP). This type of WAP gateway also is generally capable of converting data types or formats (e.g., translating the file format "gif" into "for files of type image or still image).

Telecommunication devices such as mobile radio devices or mobile phones generally differ from each other in their characteristic features or capabilities. Thus, for example, the characteristics of the display devices differ greatly in some cases (e.g., in size and resolution) and thereby also their capabilities to be able to display or process specific file types or file formats. So that a data supply component or a data supply server in a network can obtain knowledge about the characteristics or capabilities of a WAP-capable telecommunication device of a user, the WAP Forum has standardized what is known as the UA-Prof (UA-Prof: User Agent Profile), [7], with the aid of which the characteristics of a WAP-capable telecommunication device can be made known on the network side (i.e., in the network of the data supply component). The method also takes into account the capabilities of a WAP gateway which handles the data transferred between telecommunication device and data supply component and can also modify such data. On the network side, the provision of suitable data by a server also results in the characteristics of the WAP gateway being relevant.

A description is given below, with reference to FIG. 1, for a general case of how a data supply component D receives the current UA-Prof of a WAP-capable telecommunication device T. Initially, upon registration of the WAP-capable telecommunication device T or the setting up of a WSP connection, what is known as a basic profile BP or basic profile information is transferred to the WAP gateway G. If the characteristics or capabilities of the telecommunication device T have been changed or expanded by an additionally-connected line component, such as an additional hardware component (e.g., color display), an additional difference profile DP1 or first difference profile information is sent with the basic profile as a first sub-profile information object to the WAP gateway G, as is depicted by step 1 ("1" in the circle). Both profiles, namely BP and DP1, if necessary, can be buffered and evaluated by WAP gateway G; cf., step 2 WAP gateway G can now for its part supplement the received profiles BP and DP1 by a separate difference profile DP2 or second difference profile information. This is advantageous when the WAP gateway G has particular characteristics or capabilities which differ from those of the BP and DP1 profiles sent beforehand by the WAP-capable telecommunication device T or which supplement these profiles. All three profiles are then transmitted in step 3 as a second sub-profile information object to the data supply component D. The data supply component D creates on the basis of all transferred profiles (BP, DP1 and DP2) a resulting overall profile or overall profile object RP for the WAP-capable telecommunication device T, as indicated by step 4 . The resulting profile RP, containing the individual characteristics of the WAP-capable telecommunication device T and the supplementary capabilities of the WAP gateway G and possibly of other network units, is the current UA-Prof and will be administered by the data supply component D.

During a WSP session the downloading of any data, particularly user data objects, can be initiated by a WAP-capable telecommunication device T by sending a data request message. Should the characteristics or capabilities of the WAP-capable telecommunication device have changed in the interim (i.e., after a WSP connection was first established), such as through connection of another additional hardware component, in or together with a data request message issued, a current adapted difference profile DP3 or a third difference profile information are transmitted in a first sub-profile information object to the WAP gateway G in step 5 and, if necessary, evaluated there according to step 6 . The remaining transmission of the basic profile BP and the difference profiles DP3 and DP2 in a second sub-profile information object between WAP gateway G and data supply component D in accordance with step 7 and the creation of the resulting profile in accordance with step 8 are undertaken in a similar way to the method described above. If the characteristics or capabilities of the WAP-capable telecommunication device have not changed after the first setup of the WSP connection, for a data request message issued, the method refers back to the profile previously transferred and buffered in WAP gateway G (cf. step 2) or at the data supply component (cf., step 4).

The principle for generating the resulting profile is fairly sophisticated, the resulting profile or overall profile being generated from the basic profile and any number of difference profiles.

The basic assumption is further made for the use and definition of the UA-Prof that a WAP gateway recognizes and suitably handles the data types transmitted to the WAP-capable telecommunication device; i.e., changes or converts them if necessary on the path from the data supply component to the telecommunication device. A typical example of this is the conversion of an image. Assuming that the telecommunication device can only display images of the "jpeg" type or format and that the data supply component transmits a "gif"-type image, the WAP gateway can convert the image in accordance with its capabilities from type "gif" to type or format "jpeg" and pass the converted image on to the telecommunication device on which it can then be processed or displayed.

This method is, accordingly, supported by UA-Profs, in that the WAP-capable telecommunication device initially specifies in its basic profile BP the ability to process or display images of type "jpeg." The WAP gateway detects this specification, knows that it is capable itself of converting images of type "gif" into type "jpeg" and therefore specifies in difference profile DP2 that images of type "gif" also will be supported. On the data supply component side the resulting overall profile RP is generated. The data supply component, however, now no longer can distinguish between the original capabilities of the telecommunication device and the additional capabilities of the overall system of WAP-capable telecommunication device and WAP gateway. In this example, the server-side transmission (i.e., transmission on the data supply component side) of an image of type "gif" is now possible, with the gateway undertaking the corresponding conversion.

Problems may arise however, when the file types requiring conversion by the WAP gateway are enclosed (packed) into another data format which cannot be suitably handled by the WAP gateway. There are two main examples which illustrate this situation:

1. Digital Rights Management (DRM): The solution currently specified in the WAP Forum for managing rights of protected digital objects is based on the fact that the object is transported in a container file or in a container, which, for unencrypted objects is of type "application/vnd.wap.drm-.message" and for encrypted objects is of type "application/vnd.wap.drm.content." With unencrypted objects there is theoretically the option for a WAP gateway to access the enclosed object and to change it, but there is no explicit provision for this to be done. With encrypted objects the WAP gateway has no possibility of accessing the object since it does not have the key and the data, therefore, only appears as a binary packet. Even when the enclosed object is an image of the type known to the WAP gateway which, accordingly, could be converted into another type, this is not possible in the case described. The enclosed object would be passed on unchanged by the WAP gateway to the telecommunication device on which it would not be able to be displayed.

2. Multimedia Messaging Service (MMS): In the MMS the message is transmitted in the form of a Multimedia Message (MM) from a so-called MMS-Relay/Server (which serves as an MMS switching unit in a network) to an MMS Client, a specific application on the WAP-capable telecommunication device. In the solution specified by the WAP Forum the MM is a message with binary codes for presentation of the header fields which are not known to the WAP gateway. The messages are of type "application/vnd.wap.mms-message" and contain the objects to be transferred. The WAP gateway, in its turn, has the opportunity of extracting the objects from the message and adapting them to the features of the receiving telecommunication device. If an object of a specific type, requiring conversion by the WAP gateway, is integrated into the MMS message by the MMS Relay Server, the WAP gateway cannot perform its task, wherein the object arrives at the telecommunication device unchanged and cannot be used there. Furthermore, the fact that formation of an overall profile, as has been described above, makes it no longer possible to distinguish between how the integral components of the characteristics of the telecommunication device (possibly with additional hardware components) and the additional characteristics of the system made up of telecommunication device and WAP gateway also may have a negative effect if, for example, an object can be offered in different formats by the data supply component, of which some require a conversion by the WAP gateway to enable them to be processed by the telecommunication device, and others can be forwarded unchanged from the WAP gateway to the telecommunication device. Here, the server-side (i.e., from the data supply component) selection of a format which requires no conversion by the WAP gateway is advantageous since a conversion can lower the quality of the object, additional time is needed for downloading the object for conversion, computing power is required in the WAP gateway and the user can incur additional costs, depending on the billing model.

The present invention seeks to improve a method such as has been described with reference to FIG. 1, for example, such that a more efficient transmission of user data objects, particularly of encrypted or packed user data objects, is made possible.

SUMMARY OF THE INVENTION

For a method for the transmission of user data objects, a data supply component to supply user data objects is provided which transmits information objects over at least one connection component to a telecommunication device of a user in accordance with an overall profile information object. The overall profile information object specifies in this case which type of a user data object can be transmitted to the telecommunication device so that it can process the object. In addition, a first item of profile information is inserted into the overall profile information object which specifies which type of user data object can be directly processed by the telecommunication device. Furthermore a second item of profile information can be inserted which specifies which type of user data object can be converted by the connection component into a type of user data object which can be processed by a telecommunication device. This profile information, particularly the first profile information, thus allows the data supply component where possible to select the types of user data object for a transmission to the telecommunication device which can be directly processed by the telecommunication device and do not require any manipulation or conversion on the part of the connection component to enable them to be processed by the telecommunication device.

Consequently, in accordance with an advantageous embodiment, user data objects of a type in accordance with the first profile information are transmitted from the data supply component to the telecommunication device initially with high priority. As such, a check is made as to whether the data supply component is supplying user data objects able to be processed directly by the telecommunication device. If the check is successful, these types of user data objects are finally transmitted to the telecommunication device. Referring to the example given above, in which the telecommunication device is able to process image data of type "jpeg," the connection component is able to convert image data of type "gif" into type "jpeg" and finally the data supply component provides image data of type "jpeg" and "gif." The data supply component, since it recognizes from the first item of profile information that the telecommunication device can process data of a type "jpeg," immediately transmits this type of image data of type "jpeg" to the telecommunication device as user data objects. On the one hand this requires no conversion of image data by the connection component (possible conversion costs can be saved and the transmission time also reduced without conversion) and packing or encryption of user data objects is possible since the data supply component only transmits to the telecommunication device user data objects for which it knows, on the basis of the first profile information, that the device can process the user data object.

If the check as to whether the data supply component is supplying user data objects which can be processed directly by the telecommunication device produces a negative result, then, in accordance with a further embodiment of the present invention, user data objects of a type in accordance with the second profile information are transmitted at a lower priority than before from the data supply component to the telecommunication device.

In accordance with a further advantageous embodiment, the telecommunication device transmits, before the transmission of user data objects from the data supply component to telecommunication device, a first sub-profile information object with the first profile information to the connection component, which for its part supplements the first sub-profile information object by the second profile information to form a second sub-profile information object and transfers this to the data supply component. There, on the basis of the second sub-profile information object or all profile information transferred, an overall resulting profile information object can be created.

It is further possible for the telecommunication device to be expanded by an additional service component which enables it to extend the scope of the user data objects able to be processed by the telecommunication device. This type of service component can, for example, be an additional hardware component, such as a specific color display device with high resolution for displaying high-resolution and color images or graphics, and also an additional software component or software application, such as for processing and playing music data in the MP3 format. This type of service component then may be in a position to process types of user data objects which the telecommunication device can already process, but it also may be in a position to process further types of user data object which the telecommunication device itself cannot process. As a consequence, the first sub-profile information object can be supplemented by a third item of profile information which specifies the types of user data object by which the scope of the user data objects of the telecommunication device is expanded by the additional service component.

To minimize the volumes of data to be transferred between the telecommunication device and the connection component (particularly if an air interface between them is provided) and/or between the connection component and the data supply component, it is also conceivable, in accordance with an advantageous embodiment, to provide the profile information in the first and/or the second sub-profile information object in the form of a reference, which points to profile information in each case which is stored on the data supply component or on a further data supply component connected to it. As such, only addresses, for example a URL (URL: Uniform Resource Locator) can be provided in a sub-profile information object which reference a storage location in the data supply component or other data supply components, such as of the manufacturer of the telecommunication device or the additional service component. The data supply component only has to select the address when creating the overall profile object in order to obtain the corresponding profile information and insert it into the overall profile object.

In accordance with a further advantageous embodiment, the telecommunication device is located in the first telecommunication network and the data supply component and/or the further data supply component in a second telecommunication network, with the first and second telecommunication networks being connected to each other. The connection component then may be arranged in the first or second telecommunication network or serve to interconnect the two telecommunication networks. In the case of a number of connection components, the connection components can be arranged in the locations just specified (e.g., as will be explained later, a communication component can serve as a WAP gateway for connecting the two telecommunication networks while one or more other communication components can be provided, for example, as conversion units of data or user data objects in one of the specified telecommunication networks). In this case, it is possible for the first telecommunication network to be embodied as a mobile radio network, which is operated in accordance with the GSM (Global System for Mobile Communications) or the UMTS (Universal Mobile Telecommunications system) Standard. For this type of embodiment of a first telecommunication network, the user data objects can be transmitted to the telecommunication device via WAP protocols, particularly the Wireless Session Protocol. In this context, the connection component can be embodied to connect the first and second telecommunication networks as a WAP gateway. It is further conceivable for the second telecommunication network to be embodied as a network based on an Internet protocol in which the data is transferred via of the Hypertext Transfer Protocol.

In accordance with an advantageous embodiment, the telecommunication device includes a radio module and is, in particular, embodied as a mobile telephone, a cordless telephone, a portable computer or a smartphone (a combination of mobile telephone and small portable computer).

In accordance with a further advantageous embodiment, the user data objects may contain text information, audio information, video information, executable programs, software modules, or a combination of these types of data.

Additional features and advantages of the present invention are described in, and will be apparent from, the following Detailed Description of the Invention and the Figures.

BRIEF DESCRIPTION OF THE FIGURES

FIG. 2 shows a table for identification or encoding of components provided in the data transmission path into the relevant characteristic profiles.

FIG. 3 shows a diagram of a characteristic profile in XML (XML: Extensible Markup Language) in accordance with a first embodiment of the present invention.

FIG. 4 shows a diagram of a characteristic profile in XML in accordance with a second embodiment of the present invention.

DETAILED DESCRIPTION OF THE INVENTION

Figure 1:
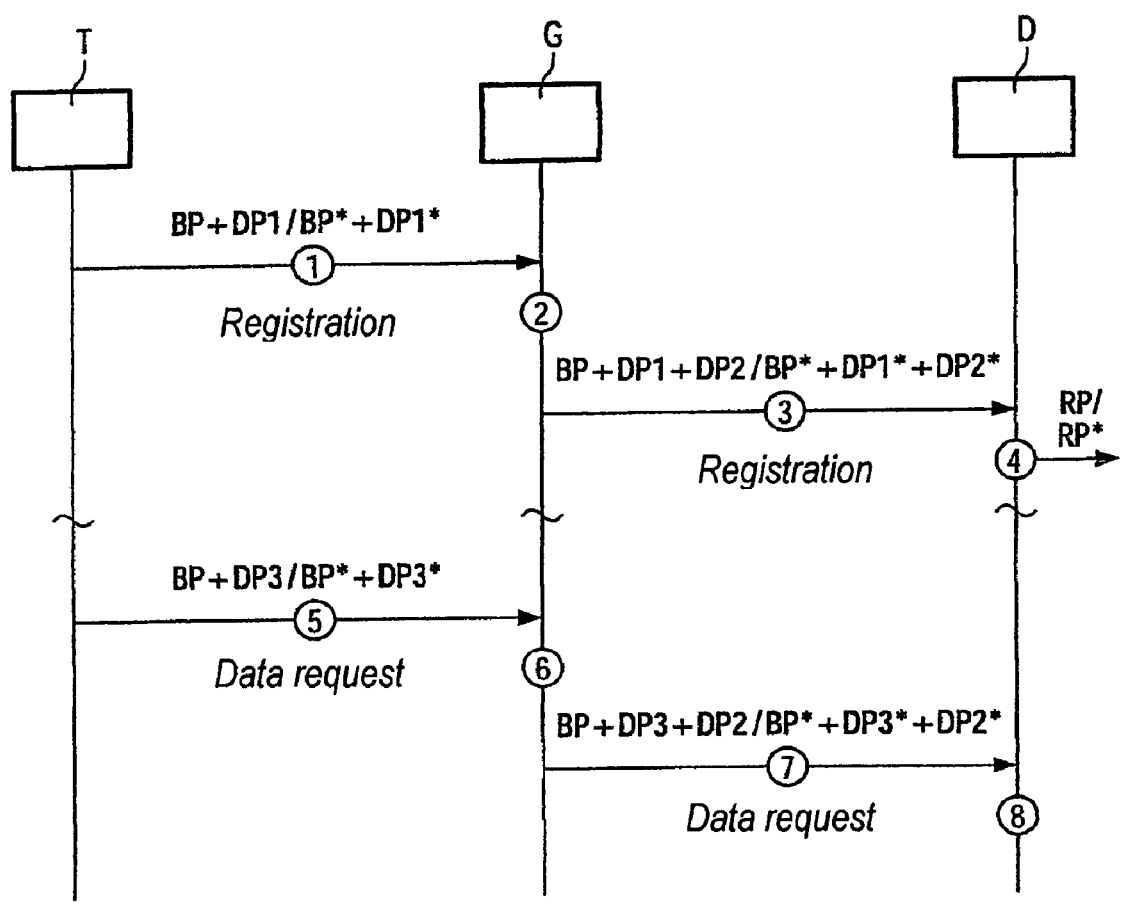
FIG. 1 shows a block diagram with the components involved in the method for transmission of the user data objects, using characteristic profiles or user agent profiles of the different components provided in the transmission path, including the data flow between the components.

Possible embodiments for transmission of user data objects from a data supply component to a telecommunication device, particularly a mobile telephone of the user (simply referred to as a terminal below) will now be explained.

For the explanation of the preferred embodiments of the invention the starting point is a corresponding configuration of the telecommunication arrangement as has already been discussed with reference to FIG. 1. A telecommunication arrangement of this type again includes a data supply component or a data server D to supply user data objects (be they encrypted or unencrypted, packed into a container file or not, etc.),a connection component G for forwarding the data or user data objects and finally a telecommunication device or terminal T of a user. Again, the starting point is that the terminal T is located in a first telecommunication network embodied as a mobile radio network, in which the data in general and particularly user data objects are transmitted via a protocol specified by the WAP Forum (WAP: Wireless Application Protocol). It is further assumed that the data supply component of a data or content provider is located in a second telecommunication network which is embodied as a network based on an Internet protocol (such as http). As a connection device to establish a data connection between the first telecommunication network and the second telecommunication network the communication component which serves in the configuration described as what is referred to as a WAP gateway is provided.

For notifying the characteristics, especially relating to processing of specific user data objects to the data supply component D, in accordance with the method shown in FIG. 1, the characteristics are represented in characteristic profiles or "UA profiles" (UA: User Agent Profile) which are advantageously based on the metalanguage XML (XML—Extensible Markup Language). XML-based formats are particularly suitable for platform and software independent exchange of structured data between programs and computers or software and hardware components of different manufacturers and systems.

A profile can describe a number of components (e.g., for software, hardware, WAP Push, etc.), where each component can contain a number of attributes and the associated values (in the hardware components, for example, possible attributes are screen size, color display capabilities, etc.). A basic structure of a profile is shown below, as has been defined by the WAP Forum for UA-Prof:

Component_1
Attribute 1a=Value 1a
Attribute 1b=Value 1b
Component_2
Attribute 2a=Value 2a
Attribute 2b=Value 2b
Attribute 2c=Value 2c
Attribute 2d=Value 2d This type of sub-division has a number of advantages. All components and attributes can be used flexibly, the structure can be expanded as required and allows easy-to-understand presentation options.

A method in accordance with a preferred embodiment of the present invention now makes it possible on the server side, that is on the part of the data supply component, for a distinction to be made between the characteristics of the WAP-capable terminal here and the additional characteristics of the combination of the WAP-capable terminal and further components present in the data transmission network such as the connection component (simply referred to below as WAP gateways). Using the method shown in FIG. 1 as a starting point, the individual profiles or UA profiles (basic profile and a difference profile) are identified as to their origin, which allows an evaluation on the server side as to which conversion functionality of the WAP gateway or of a possible additional conversion server, present, for example in the second telecommunication network, can be used in the transmission or assignment of content (as regards user data objects) in a specific format and which cannot.

There are different options for identifying the reference of a profile of a UA-Prof:

a) In one of the simplest variants the identifier only distinguishes between "terminal" and "intermediate entity" (such as WAP gateways). To this end, the profile can be provided with simple markings, with the marking of the profile type also being sufficient; e.g., the marking of the profile of intermediate entities (WAP gateways, conversion servers, etc.). An advantage of this variant is that changes are not absolutely required on the terminal side nor at the air interface.

b) In a somewhat more complex variant each terminal or each component in the transmission path provides a separate profile with an individual, previously-agreed code (textual or binary). For example binary code "2" refers to" this profile originates from a WAP gateway." A greater certainty compared to variant a) as to the source from which a profile originates is advantageous since each profile is to be identified here. In addition, further differentiation can be obtained if, instead of a simple marking (Boolean expression), a larger set of values is used, enabling the categories "WAP-capable terminal," "WAP gateway," "WAP proxy" (as a further component in the transmission path) and further components to be distinguished.

c) This variant builds on variant b) but also contains the information about whether further (difference) profiles may be transmitted by subsequent units or components in the transmission path. For specific applications it thus becomes possible to suppress the signaling of conversion options by the WAP gateway and other subsequent conversion units.

The application of a method in accordance with an embodiment of the present invention, for example on loading DRM (DRM: Digital Rights Management) protected objects and also for MMS (MMS: Multi Media Messaging Service) has an advantage that the data supply component or the data supply server can look at the characteristics of the WAP-capable terminal alone and only send the objects or user data objects suitable for it. Unsuitable objects are recognized directly by the data supply component and not transmitted, so the user is not sent unusable objects by mistake.

If the data supply component is able to supply user data objects with the same content but different data types, an identification of characteristics in UA profiles, that is an assignment of characteristics to a specific component in the transmission path, has the effect that the data supply component always selects for transmission with higher priority a user data object which can be used on the terminal side without conversion by an intermediate component in the transmission path such as the WAP gateway. Unnecessary data format conversions are thus avoided.

To reiterate, in accordance with the embodiment presented, profiles and (after merging of profiles) profile components are identified in accordance with their origin and the server side distinction which this makes possible between characteristics of the WAP-capable terminal and additional characteristics of the overall system consisting of WAP-capable terminal, WAP gateway and possibly further components on the transmission path which can change the content to be transmitted. With the identification of the individual profiles or UA-Profs, the following questions can be resolved on a server side concerning the transmission unit (WAP-capable terminal, WAP gateway, intermediate conversion unit, etc.) from which the corresponding profile originates. The server at the end of the transmission chain is intended to take this additional information into account in selecting between different available file types and formats. In addition, a unit has the opportunity of suppressing further appending of difference profiles if necessary.

At this point it should be pointed out once again that the method described herein is not restricted to the embodiments given as examples here, but can also be applied to other WAP-based applications.

The advantages of the principles depicted above with regard to a method for transmission of user data objects using profiles or UA-Profs, especially in connection with the delivery of protected objects, the delivery of multimedia messages in the Multimedia Messaging Service and for browsing on the basis of the protocols specified in the WAP Forum now will be presented in detail.

In accordance with the following example, it is assumed that a WAP-capable terminal which cannot display still images is, however, expanded by a plug-in hardware module to provide this function so that it can also display still images in the "jpeg" format. As already explained above, the terminal is connected to the Internet via a WAP gateway which is further able to convert still images from the "gif" format into the "jpeg" format. The difference between the method described here and the method described at the beginning with reference to FIG. 1 now lies in the fact that the profiles can be identified as regards their origin. As such, in addition to the capabilities of the corresponding terminals or transmission units, the information about the terminal or the transmission unit such as the WAP gateway from which the relevant difference profile originates is included. These expanded profiles are indicated below by an asterisk. Otherwise, the transmission and processing of the relevant profiles proceeds as already described with reference to FIG. 1 which is why, for the explanation of the individual steps regarding the profiles expanded by an asterisk in the following text, reference is made to the explanation of the profile without the asterisk.

Referring to FIG. 1, the WAP-capable terminal T, as well as its basic profile BP*, also transmits the difference profile DP3* (cf., step 5), which describes the additional capabilities provided by the a hardware module plugged in at the WAP gateway G. As well as the two profiles of the WAP-capable terminal (basic profile BP* and difference profile DP3*), this also sends its own difference profile DP2* to the data supply component D (like the scenario depicted in FIG. 1).

As such, the last element in the transmission chain or the transmission path (here, the data supply component D) has knowledge when determining the resulting profile RP* (corresponding to the overall profile) about which capabilities the WAP-capable terminal (expanded with the module) possesses (namely, the display of still images in the "jpeg" data format), and which capabilities are to be assigned to an intermediate transmission unit (namely, the conversion of still images in the "gif" data format into the "jpeg" data format by the WAP gateway). The semantics of the identification will be examined below. Of the variants described above for identifying the profiles, variant c) will be used below, in which, on the one hand, the function of the unit described in the profile (WAP-capable terminal, WAP gateway, etc.) will be identified and, on the other hand, there will be an indication of whether further profiles of subsequent units of the transmission chain may be added.

FIG. 2 shows a table in accordance with an advantageous embodiment of a binary encoding for identification of profiles. In accordance with this table, a WAP-capable terminal can send its basic profile either with the binary identifier "-1" or "0" and thereby allow or prevent the other transmission units in the transmission chain from transmitting their difference profiles. The next element in the transmission chain (WAP-capable terminal with add-on module, WAP gateway, possibly WAP proxy or conversion server, etc) which would like to a supplement a difference profile, first evaluates the basic profile of the WAP-capable terminal. If supplementing of difference profiles is allowed, it can now transfer its own difference profile with a corresponding identification in accordance with the table shown in FIG. 2. In this way it would be possible for the last element in the transmission chain (i.e., the server) to distinguish between the various (difference) profiles.

Independently of this, each terminal or each transmission unit additionally may sequentially number its profile. In this case, the data supply component D would even receive information about the sequence of the network elements involved in the transmission of the data.

The syntax of the identification will be examined below. Different options for identifying a profile will be examined quite generally. The examination will no longer differentiate between basic profile and difference profile(s). In the identification the semantics described above in accordance with the table shown in FIG. 2 preferably should be used, but any other previously agreed semantics are also usably.

Possible alternative embodiment options for identifying a profile are as follows:

1. The transmission profile is prefixed by a new header field in the corresponding session layer (HTTP or WSP). The two Session Layer protocols used here, HTTP and WSP (WSP: Wireless Session Protocol), allow in accordance with [8] and [9] the definition of new header fields and use the textual formats described in [10] when doing so, in accordance with which a header field consists of a field name (mandatory) and a field value (optional). So that not too much data has to be transmitted over the air interface WSP, [9] recommends binary encoding for frequently used ("well-known") header fields. Thus, for example, from a field/attribute "X-Mms-Transmitter-Visibility: Show" (29 Bytes) the short form "93 11" in hexadecimal encoding (two bytes) is produced.

In accordance with a preferred embodiment of the present invention, the introduction of new header fields is proposed for identification of profiles which also should be based on the format described in [10]. The field name of the new header field for the two profiles described here HTTP and WSP could be called "x-wap-profile-source," for example.

The presentation below shows the textually encoded header field "x-wap-profile-source" on the left with a textually encoded field value on the right with a binary-encoded (decimal) field value:

x-wap-profile-source: WAP gateway; x-wap-profile-source: 2

2. The tagging is undertaken directly in the HTTP or WSP by an additional parameter. As such, in principle, the same information encoding as in the approach described under 1is possible. To this end, for example, the definition of the header field "x-wap-profile" is expanded by a parameter or allows the server-side assignment to a unit in the system.

3The profile is expanded by a new XML attribute. As already explained above, all profiles are advantageously described for a WAP UA-Prof.based on XML. Self-contained information blocks or individual information is delimited within a profile by what are known as tags. Most of these tags occur in pairs in XML applications as start and end commands and specify the meaning of the text enclosed within them. This text can, in its turn, be subdivided by further tags, for example, to allow lists of parameters for an attribute. The parameters of the individual tags are called attributes. They are always enclosed within quotation marks ("<"and ">").

FIG. 3 shows the use of the newly defined XML attributes "Source" (highlighted in bold; entire new element enclosed by double arrows) which allow a profile (or an individual profile component) to be identified by a terminal or by a transmission unit. When a new XML attribute is used, the associated new XML "name space" must be referenced in the corresponding profile, identified in this example by "prf2" The value of this source attribute is encoded textually in FIG.

3 (WAP GW or WAP Gateway). Also possible is a binary encoding of the attribute value in accordance with the table in FIG. 2 (e.g., "WAP Gateway"="2").

If one also wishes to implement a consecutive numbering of profiles (as described above) with the aid of XML attributes, the following two options are available for this purpose:

The attribute value of the attribute "Source" is defined in such a way that it consists of a list of parameters with different meanings. FIG. 4 shows an example of this in which the attribute value of "source" consists of a list of two parameters, with the bracketing mechanism of attribute values described in the introduction being implemented. Within the attribute "source," "Bag" signals that a number of attribute values follow (in accordance with the present invention and new components are again enclosed within two brackets). The expansion "Seq" in the brackets refers to the sequence of the parameters in the list being of significance. By definition, parameter 1 for example could stand for consecutive numbering and parameter 2 for the identification of the profile by a terminal or a further component in the transmission path (e.g., a network unit), preferably by the code defined in the table in FIG. 2.

In addition to the textual encoding of UA-Profs or UA profiles shown here, [7] also allows a binary method of representation in which all textual attributes are assigned what are known as binary tokens. Naturally, the principles described above also could be expressed in a binary encoded UA-Prof.

A method described above for the transmission of user data objects using attribute profiles or UA-Profs also may be applied for the transmission of DRM-protected objects. If, in this case, in the embodiment of the telecommunication arrangement described above or the profile transmission and processing of the relevant components of a telecommunication arrangement of the WAP-capable terminal (T; cf., FIG. 1) DRM-protected data is requested, the information flow is as illustrated below:

1. The WAP-capable terminal (T) sends a data request initially to the WAP gateway (G). This contains a basic profile BP* (let reference again be made to FIG. 1 for the following explanations) and the difference profile DP3* for description of the add-on module. Both profiles are identified by the new information described above to indicate that they can be assigned to the WAP-capable terminal (T).

2. The WAP gateway (G) receives the data request and forwards it to the data supply component (D). In doing so, it supplements the data request by the difference profile DP2* which according to the new identification can be assigned to the WAP gateway.

3. The data supply component (D) receives the data request, evaluates the profile information and detects that the requested image can be used by the terminal (T) itself in the "jpeg" format and that the WAP gateway (G) can convert images from "gif" format into a format suitable for the terminal (this only refers to "jpeg" here). If the object or the user data object (the image) is now to be transmitted in DRM-protected form, it initially must be packed or encrypted into another data format (e.g., "application/vnd.wap.drm.message or application/vnd.wap.drm.content") which would make it inaccessible for the WAP gateway (G). The data supply component (D) thus decides to pack the object in the "jpeg" format into the DRM format so that processing of the object by the WAP gateway is not necessary. The data supply component (D) sends the object or user data object to the WAP gateway in the format described.

4. The WAP gateway receives the object, detects that no processing of the object or an action by the WAP gateway (G) is necessary and transmits it to the terminal (T).

5. The terminal receives the object, unpacks it and can use it.

Without the procedure described above in accordance with an embodiment of the present invention the same process would appear as follows:

1. The WAP-capable terminal (T) sends a data request initially to the WAP gateway (G). This contains the basic profile BP and the difference profile DP3 for description of the supplementary module (again, cf., FIG. 1).

2. The WAP gateway (G) receives the data request and forwards it, supplemented by the difference profile DP2, to the data supply component (D).

3. The data supply component (D) receives the data request, evaluates the profile information and recognizes that the requested data or the requested image can be used by the combination of terminal (T) and WAP gateway (G) in "jpeg format" and in "gif format." The object is to be transmitted in DRM-protected form and to this end must first be packed into another data format (application/vnd.wap.drm.message or application/vnd.wap.drm.content) which makes it inaccessible to the WAP gateway. The data supply component of (D) may possibly decide to pack the object in the "gif" format into the DRM format, and send the object to the WAP gateway (G) in the format described.

4. The WAP gateway (G) receives the object, recognizes that it cannot process the object since it does not recognize the data format enclosing it or cannot process this format, does not change the object and transmits it to the terminal.

5. The terminal (T) receives the object, unpacks it from the enclosing data format and, however, cannot use it.

Although the present invention has been described with reference to specific embodiments, those of skill in the art will recognize that changes may be made thereto without departing from the spirit and scope of the present invention as set forth in the hereafter appended claims.

Background information about the protocols discussed in the application may be found in the following reference sources:

[1] 3GPP TS 23.040 version 5.2.0, Release 5; Third Generation Partnership Project; Technical Specification Group Terminals; Technical realization of the Short Message Service (SMS).

[2] 3GPP TS 22.140 version 4.1.0, Release 4; Third Generation Partnership Project; Technical Specification Group Services and System Aspects; Service Aspects; Stage 1; Multimedia Messaging Service (MMS).

[3] 3GPP TS 23.140 version 5.1.0, Release 5; Third Generation Partnership Project; Technical Specification Group Terminals; Multimedia Messaging Service (MMS); Functional Description; Stage 2.

[4] WAP-274-MMS Architecture Overview; WAP Multimedia Messaging Service (MMS) Specification Suite 2.0.

[5] WAP-275-MMS ClientTransaction; WAP Multimedia Messaging Service (MMS) Specification Suite 2.0.

[6] WAP-276-MMS Encapsulation; WAP Multimedia Messaging Service (MMS) Specification Suite 2.0.

[7] WAP-248-UAProf; WAG User Agent profile; October 2001.

[8] RFC 2616 "Hypertext Transfer Protocol—HTTP/1.1"; June 1999.

[9] WAP-230-WSP Wireless Session Protocol Specification, approved version 5 Jul. 2001.

[10] RFC 822 "Standard for the format of ARPA Internet text messages"; David H. Crocker; Aug. 13, 1982.

The invention claimed is:

1. A method for transmitting user data objects from a data supply component to a terminal of a user, via a connection component, the method comprising:
   the terminal providing a first item of profile information that specifies at least one direct process capability of the terminal;
   the terminal transmitting a first sub-profile information object with the first item of profile information;
   providing a second item of profile information that specifies at least one conversion capability by the connection component of user data objects into a type of user data object which the terminal is capable of processing;
   the connection component supplementing the first sub-profile information object with the second item of profile information to form a second sub-profile information object;
   the connection component transmitting the second sub-profile information object to the data supply component;
   creating a resulting profile information object based on all transmitted profile information at the data supply component, the resulting profile information object specifying process capabilities of the terminal and the connection component; and
   transmitting the user data objects of a type in accordance with the first item of profile information from the data supply component to the terminal via the connection component.

2. A method for transmitting user data objects as claimed in claim 1, further comprising transmitting the user data objects of the type in accordance with the second profile information from the data supply component to the terminal if no user data objects of the type in accordance with the first profile information are available to be provided by the data supply component.

3. A method for transmitting user data objects as claimed in claim 2, further comprising supplementing the terminal with an additional service component which may expand a scope of the user data objects able to be processed by the terminal.

4. A method for transmitting user data objects as claimed in claim 3, further comprising expanding the first sub-profile information object by a third item of profile information which specifies the types of the user data objects by which the scope of the user data objects of the terminal is expanded by the additional service component.

5. A method for transmitting user data objects as claimed in claim 2, wherein, in at least one of the first and second sub-profile information objects, the profile information is provided in reference form which refers in each case to profile information which is stored on one of the data supply component and a further data supply component connected thereto.

6. A method for transmitting user data objects as claimed in claim 1, wherein the terminal is located in a first telecommunication network and at least one of the data supply component and a further data supply component connected thereto are located in a second telecommunication network, with the first and second telecommunication networks being connected to each other.

7. A method for transmitting user data objects as claimed in claim 6, wherein the connection component is arranged in one of the first and second telecommunication networks or is intended to connect the first and second telecommunication networks together.

8. A method for transmitting user data objects as claimed in claim 6, wherein the first telecommunication network is a mobile radio network which is operated in accordance with at least one of a GSM standard and a UMTS standard.

9. A method for transmitting user data objects as claimed in claim 8, wherein the user data objects are transmitted to the terminal in the first telecommunication network via a Wireless Session Protocol.

10. A method for transmitting user data objects as claimed in claim 6, wherein the second telecommunication network is a network based on an Internet protocol in which data is transmitted via a Hypertext Transfer Protocol.

11. A method for transmitting user data objects as claimed in claim 1, wherein the terminal includes a radio module.

12. A method for transmitting user data objects as claimed in claim 11, wherein the terminal is one of a mobile telephone, a cordless telephone, a portable computer and a smartphone.

13. A method for transmitting user data objects as claimed in claim 1, wherein the connection component is a WAP gateway.

14. A method for transmitting user data objects as claimed in claim 1, wherein the user data objects include at least one of text information, audio information, video information, executable programs and software modules.

15. A system for transmitting user data objects, comprising:
   a data supply component;
   a connection component; and
   a terminal of a user;
   wherein the terminal provides a first item of profile information that is subsequently inserted in the resulting profile information, the first item of profile information specifying at least one direct process capability of the terminal;
   wherein the terminal provides a first sub-profile information object with the first item of profile information;
   wherein the connection component provides a second item of profile information that specifies at least one conversion capability by the connection component of user data objects into a type of user data object which the terminal is capable of processing;
   wherein the connection component supplements the first sub-profile information object with the second item of profile information to form a second sub-profile information object, and transmits the second sub-profile information object to the data supply component;
   wherein the data supply component creates a resulting profile information object based on all transmitted profile information at the data supply component, the resulting profile information object specifying process capabilities of the terminal and the connection component; and
   wherein the user data objects of the type in accordance with the first item of profile information are transmitted from the data supply component to the terminal via the connection component.

16. A method for transmitting user data objects from a data supply component to a terminal of a user, via a connection component, the method comprising:
   providing a resulting profile information object which specifies which type of the user data objects are allowed to be transmitted to the terminal, wherein the specified types in the resulting profile are either directly processed by the terminal or pre-processed by the connection component;
   the terminal providing a first item of profile information that specifies at least one direct process capability of the terminal;

the terminal providing a first sub-profile information object with the first item of profile information;

providing a second item of profile information that specifies at least one conversion capability by the connection component of user data objects into a type of user data object which the terminal is capable of processing;

the connection component supplementing the first sub-profile information object with the second item of profile information to form a second sub-profile information object;

the connection component transmitting the second sub-profile information object to the data supply component;

creating a resulting profile information object based on all transmitted profile information at the data supply component, the resulting profile information object specifying which type of the user data objects are allowed to be transmitted to the terminal, wherein the specified types in the resulting profile are either directly processed by the terminal or pre-processed by the connection component; and transmitting the user data objects of the type in accordance with the first item of profile information from the data supply component to the terminal via the connection component.

17. A method for transmitting user data objects as claimed in claim 16, further comprising transmitting the user data objects of the type in accordance with the second profile information from the data supply component to the terminal if no user data objects of the type in accordance with the first profile information are available to be provided by the data supply component.

* * * * *